United States Patent [19]

Bateman

[11] Patent Number: 5,032,025

[45] Date of Patent: Jul. 16, 1991

[54] WAVELENGTH NORMALIZATION OF FIBER-OPTIC LOSS MEASUREMENTS

[75] Inventor: Glenn Bateman, Redmond, Oreg.

[73] Assignee: Tektronix, Inc., Beaverton, Oreg.

[21] Appl. No.: 520,317

[22] Filed: May 7, 1990

[51] Int. Cl.$^5$ ................... G01N 21/84; G01N 21/27
[52] U.S. Cl. .................................................. 356/73.1
[58] Field of Search ...................................... 356/73.1

[56] References Cited

PUBLICATIONS

Wilson et al., "Automated Spectral Loss Measurement of Optical Fibres" Optics & Laser Technology, Aug. 1978, vol. 10, No. 4, pp. 197-199.

Primary Examiner—Vincent P. McGraw
Attorney, Agent, or Firm—Francis I. Gray

[57] ABSTRACT

A method of normalizing fiber-optic loss measurements for wavelength uses a measured wavelength for a laser, a desired wavelength for the loss measurement, and a characteristic parameter for the fiber optic cable to perform a first order correction of the Rayleigh scattering from the fiber optic cable. The actual loss is measured using the laser and then corrected to produce the equivalent loss at the desired wavelength according to the equation $$Ld = La + (Lm/l - La)(\lambda m/\lambda d)^4$$

where Ld is the desired loss, La is the characteristic loss for the fiber optic cable, l is the length of the fiber optic cable, $\lambda m$ is the measured wavelength and $\lambda d$ is the desired wavelength. The resulting equivalent loss is displayed in an alphanumeric and/or a symbolic format.

4 Claims, 2 Drawing Sheets

WAVELENGTH NORMALIZATION OF FIBER-OPTIC LOSS MEASUREMENTS

BACKGROUND OF THE INVENTION

The present invention relates to optical time domain reflectometer loss measurements, and more particularly to a method of wavelength normalization of fiber-optic loss measurements so that the accuracy of the loss measurement at a specified optical wavelength is enhanced.

In optical time domain reflectometry a laser transmits an optical pulse into an optical fiber being tested. The Rayleigh backscatter, reflections and losses from the fiber in response to the optical pulse are detected, analyzed and displayed in order to characterize and detect faults in the fiber. For economic reasons the laser has specifications that are looser than those generally required by an end user. Or the wavelength specified by one end user for loss measurements may differ from that specified by another end user by a slight amount. In order to accommodate end user specification of wavelength for loss measurements, either an expensive, highly accurate wavelength laser for each specified measurement wavelength, or the acceptance by the end user of a greater error range in the resulting loss measurement, is required.

What is desired is a wavelength normalization technique for fiber-optic loss measurements that does not require expensive lasers while providing an enhanced loss measurement accuracy for the wavelength specified by the end user.

SUMMARY OF THE INVENTION

Accordingly the present invention provides a method of wavelength normalization of fiber-optic loss measurements that compensates for the difference in wavelength between the laser and the wavelength specified by an end user. First the wavelength of the laser is accurately measured and the result is stored in a memory, such as a read only memory (ROM), of a measurement instrument. The end user inputs the desired wavelength for the loss measurement and a characteristic parameter for the fiber being tested to the measurement instrument. The measurement instrument is then used to conduct loss measurements for the fiber using the laser, and a microprocessor, based upon the actual laser wavelength and the end user inputs, corrects the actual measured losses obtained by the instrument to produce an equivalent loss at the desired wavelength. The equivalent loss is then displayed on the instrument to the end user.

The objects, advantages and other novel features of the present invention are apparent from the following detailed description when read in conjunction with the appended claims and attached drawing.

DESCRIPTION OF THE PREFERRED EMBODIMENT

Figure 1:
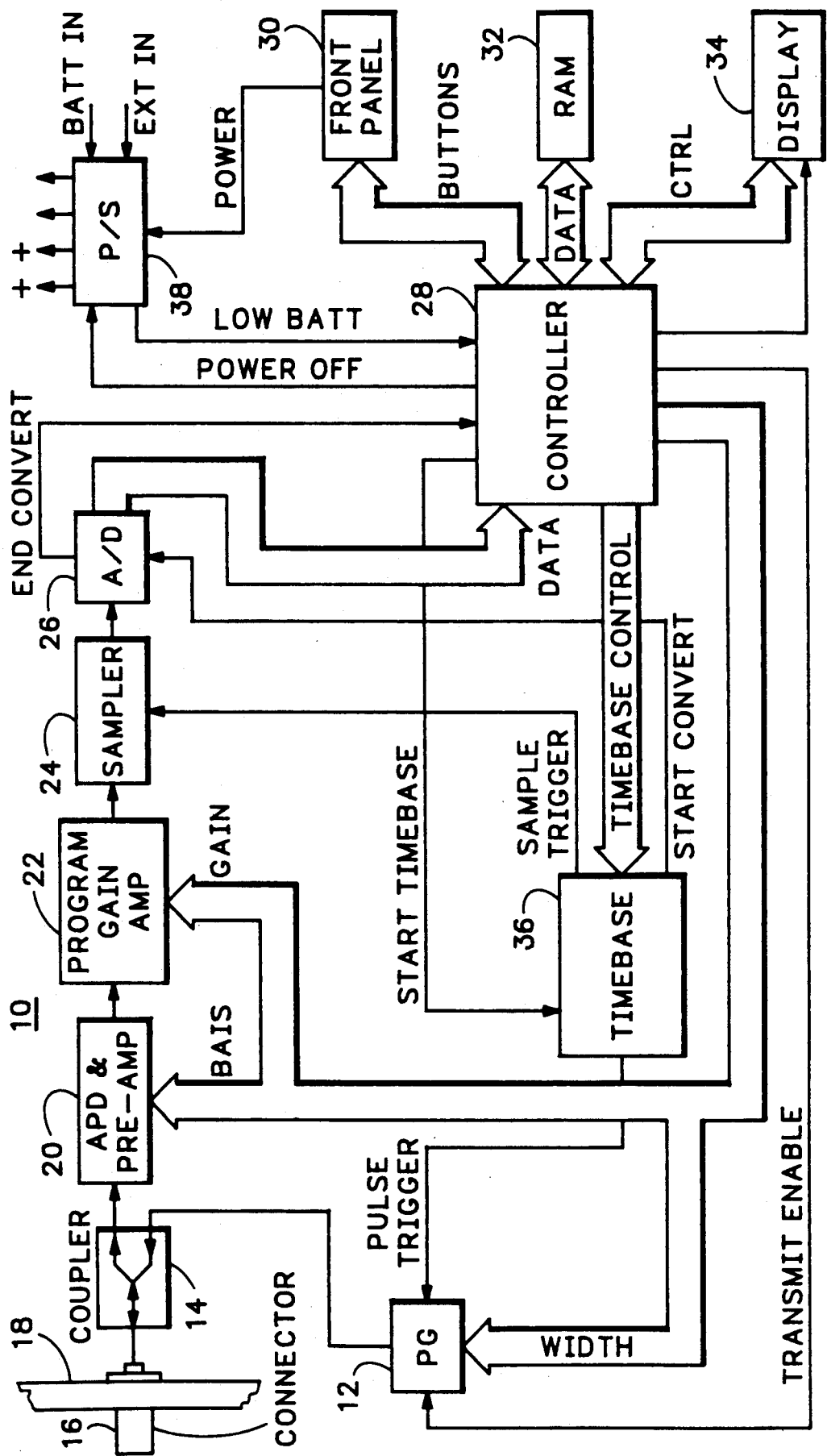
FIG. 1 is a block diagram of an instrument for making loss measurements of a fiber under test according to the present invention.

Referring now to FIG. 1 an optical time domain reflectometer (OTDR) 10 suitable for implementing a wavelength normalization of fiber-optic loss measurements according to the present invention is shown. A laser 12 in response to a pulse trigger generates an optical pulse via a coupler 14 to a connector 16 mounted in a housing 18 for input into one end of a fiber optic cable under test (not shown). Energy reflected from the fiber optic cable returns to the OTDR 10 via the connector 16 to the coupler 14. The reflected energy is passed by the coupler 14 to a detector/preamplifier 20. The detector 20 may be an avalanche photodiode (APD) with associated amplifier. The resulting electrical signal from the detector/preamplifier 20 is input to a programmable gain stage 22 and then sampled by a sampling circuit 24. The data samples from the sampling circuit 24 are input to an analog-to-digital converter (ADC) 26, and the digitized samples are input to a controller 28 for processing. The controller 28 interacts with a front panel 30 by which an operator inputs appropriate operating parameters. The controller 28 includes a read only memory (ROM) and has an external memory (RAM) 32 for storage of OTDR instrument settings. Finally the data processed by the controller 28 is viewed on a display device 34, such as a liquid crystal display (LCD).

The controller 28 provides a transmit enable signal to the laser 12 to enable the laser to respond to the pulse trigger signal from a timebase generator 36 controlled by the controller. The controller 28 also controls the width of the pulse generated by the laser 12, the bias for the detector/preamplifier 20, and the gain for the programmable gain stage 22. A power supply 38 for the OTDR 10 is controlled from the front panel 30 and monitored by the controller 28 to turn off the power supply when the power supply energy becomes too low or otherwise deviates from nominal limits.

In operation the controller 28 receives measurement directions via the front panel 30 from an operator and starts testing in response to a "start test" command. The timebase generator 36 is started by the controller 28 and operates according to the parameters from the controller to generate pulse triggers to the laser 12. The transmit enable signal from the controller 28 to the laser 12 enables the generation of the optical pulses in response to the pulse trigger signal. The interval between the pulse triggers is determined by the timebase control parameters from the controller 28. The sampling circuit 24 is activated by a sampling trigger from the timebase generator 36, with the sampling rate being controlled by the controller 28. Likewise the conversion of the data samples to digital by the ADC 26 is initiated by a start convert signal from the timebase generator 36, the start time being controlled also by the controller 28. An end convert signal from the ADC 26 wakes up the controller 28 to process the sampled digital data. After data for the entire fiber optic cable has been processed, the controller 28 formats the data for display on the LCD display 34 in both a symbolic format and an alphanumeric format.

Figure 2:
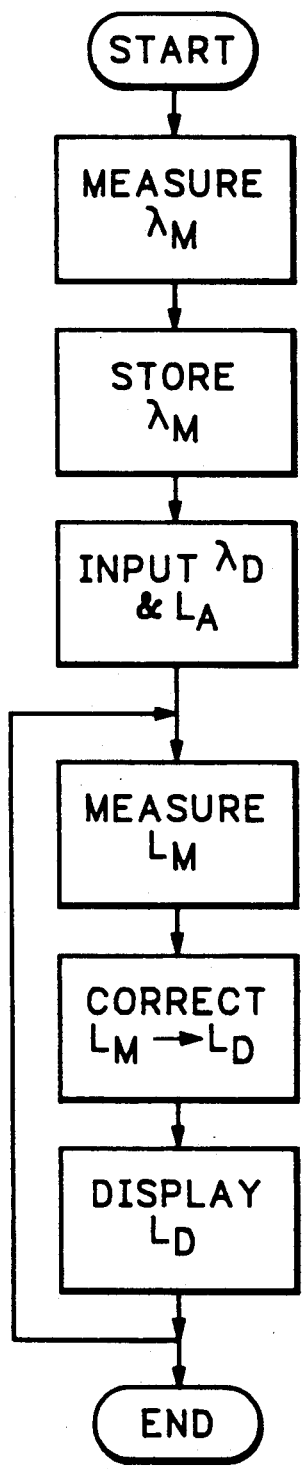
FIG. 2 is a flow chart of the wavelength normalization of fiber-optic loss measurements according to the present invention.

When measuring loss on fiber optic cables, the loss varies with wavelength. This gives inconsistent readings between instruments unless the wavelengths of the measuring instruments are the same. The principal loss in a fiber optic cable is due to Rayleigh scattering, with microbending, impurities and the OH ion contributing the rest. The latter losses (La) are characteristic of the fiber optic cable, and are controlled through the manufacturing process. To produce consistent measurements from instrument to instrument the measured loss (Lm)

produced by the instrument has to be corrected to that at a desired wavelength ($\lambda d$). As shown in FIG. 2 the actual wavelength ($\lambda m$) of the laser in the instrument is measured during manufacturing and stored in a memory, such as the read only memory (ROM) of the controller 28. When a measurement is to be made, an operator inputs the known loss characteristic (La) of the fiber optic cable to be measured and the desired wavelength ($\lambda d$) for the measurement, which is stored in the RAM 32.

A first order correction for the wavelength dependent Rayleigh scattering loss may now be made by normalizing to the desired wavelength ($\lambda d$).

$$Ld = La + (Lm/l - La)(\lambda m/\lambda d)^4$$

where Ld is the loss at the desired wavelength in dB, La is the characteristic loss of the fiber optic cable in dB/meter, Lm is the actual measured loss in dB, and l is the length of the fiber optic cable measured in meters. If Lm includes splice loss (Ls), which is determined by the controller 28 as indicated in co-pending U.S. patent application Ser. No. 07/450,120 filed Dec. 12, 1989 by Holmbo et al entitled "Method of Detecting and Characterizing Anomalies in a Propagative Medium", then $$Ld = La + ((Lm - Ls)/l - La)(\lambda m/\lambda d)^4.$$

Once the actual loss at the desired wavelength is determined, then it is displayed on the display 34.

Thus the present invention provides a wavelength normalization of fiber-optic loss measurements by using known values for the wavelength of a laser in a measurement instrument and for the loss characteristic of a fiber optic cable to be measured together with a desired measurement wavelength, and performing a first order correction for the Rayleigh scattering measured from the fiber optic cable to produce an equivalent loss at the desired measurement wavelength for display.

What is claimed is:

1. A method of normalizing fiber-optic loss measurements for wavelength comprising the steps of:

storing a measured wavelength for a laser, a desired measurement wavelength and a characteristic parameter for a fiber optic cable to be tested;

measuring an actual loss for the fiber optic cable using the laser;

correcting the actual loss as a function of the measured wavelength, the desired measurement wavelength and the characteristic parameter to produce a desired loss at the desired measurement wavelength; and displaying the desired loss.

2. A method as recited in claim 1 wherein the correcting step comprises the steps of:

subtracting anomalous losses from the actual loss to produce an intermediate actual loss; and correcting the intermediate actual loss to produce the desired loss.

3. In an optical time domain reflectometer a method of normalizing fiber-optic loss measurements for a desired wavelength comprising the steps of:

measuring an actual loss for a fiber optic cable under test;

correcting the actual loss as a function of a measured wavelength for the laser of the optical time domain reflectometer, the desired wavelength and a characteristic parameter for the fiber optic cable to produce a desired loss at the desired wavelength; and displaying the desired loss.

4. A method as recited in claim 3 wherein the correcting step comprises the steps of:

subtracting anomalous losses from the actual loss to produce an intermediate actual loss; and correcting the intermediate actual loss to produce the desired loss.

* * * * *